United States Patent
Shafiyan-Rad et al.

(10) Patent No.: US 6,940,276 B2
(45) Date of Patent: Sep. 6, 2005

(54) SENSOR FOR POWER CLAMP ARM

(75) Inventors: Saeed Shafiyan-Rad, Nashua, NH (US); Larry Joseph Fisher, Nashua, NH (US); Daniel M. Corbosiero, Jr., Hudson, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 148 days.

(21) Appl. No.: 10/436,651

(22) Filed: May 13, 2003

(65) Prior Publication Data

US 2004/0227508 A1 Nov. 18, 2004

(51) Int. Cl.[7] .............. B23Q 3/08; B23Q 3/00; G01B 7/30; G01B 7/14
(52) U.S. Cl. .............. 324/207.22; 324/207.26; 324/207.25; 269/32; 269/329
(58) Field of Search .............. 324/207.25, 207.22, 324/207.26; 269/32, 329

(56) References Cited

U.S. PATENT DOCUMENTS

| | | | | |
|---|---|---|---|---|
| 5,476,272 A | * | 12/1995 | Hixson, II | 277/317 |
| 5,694,042 A | * | 12/1997 | Eaton et al. | 324/207.22 |
| 6,094,912 A | * | 8/2000 | Williford | 60/520 |
| 6,107,794 A | * | 8/2000 | Kipp et al. | 324/207.23 |
| 6,192,284 B1 | * | 2/2001 | Golden | 700/56 |
| 6,310,473 B1 | * | 10/2001 | Zhao | 324/207.25 |
| 6,593,734 B1 | * | 7/2003 | Gandel et al. | 324/207.25 |
| 6,694,861 B2 | * | 2/2004 | Glasson | 92/5 R |
| 2003/0030431 A1 | * | 2/2003 | Reininger | 324/207.2 |

* cited by examiner

*Primary Examiner*—Jay Patidar
*Assistant Examiner*—David M Schindler
(74) *Attorney, Agent, or Firm*—Quarles & Brady LLP; William R. Walbrun

(57) ABSTRACT

A sensor for measuring a clamp arm position in a power clamp provides a sensor wheel that may fit beneath the clamp arm. A low profile sensor body abuts an edge of the sensory wheel to detect the sensor position without undue change in the power clamp or clearance about the power clamp.

24 Claims, 3 Drawing Sheets

SENSOR FOR POWER CLAMP ARM

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to power clamps used in industry, and in particular, to a sensor for sensing the position of a clamp arm of a power clamp.

Power clamps provide a pneumatic and hydraulic cylinder that drives a rotating clamp arm. Depending on the application, the clamp arm may rotate in an arc ranging from 18 to 118 degrees between a clamped and unclamped position.

When power clamps are used in automated processes, it is desirable to develop an electrical signal indicating the position of the clamp so that the clamping process may be monitored and verified. Traditionally this has been done by detecting a position of the piston in the cylinder of the power clamp. Monitoring the piston, however, is less than ideal, in part, because it only indirectly indicates the position of the clamp arm and cannot detect possible failure of the clamp arm rotating mechanism.

U.S. Pat. No. 5,694,042 describes a sensor for a power clamp that senses the position of the clamp arm directly by attaching two sensing disks directly to a free end of the axle of the clamp arm opposite the clamp arm. The sensor described is relatively bulky and thus may not be suitable for applications requiring tight clearances. Further, the sensor requires special modification of that axle through the drilling of holes into the axle by which to mount the sensing disk.

BRIEF SUMMARY OF THE INVENTION

The present invention provides a low profile sensor for directly sensing the clamp arm position. A single sensing ring is slipped around the axle of the clamp arm beneath the clamp arm to be received within a notched cutout of a sensor body attached to the power clamp housing. The sensing ring includes radially extending metallic targets that may be sensed by corresponding proximity sensors in the sensor body-directed toward the notch of the sensor body. Multiple targets may be placed in the sensing wheel and multiple sensors in the plane of the sensing body so that a single wheel may be used, making the system extremely compact.

Specifically, the present invention provides a sensor for use with a clamp having a piston actuated rotary clamp arm. The sensor includes a sensing ring coaxially attached to an axle of the rotary clamp arm to rotate therewith about a rotation axis. The sensing ring has a circumferential wall, including at least one target exposed toward the circumferential wall. A sensing body has a notch opening on one side to receive the sensing ring with motion of the sensor body perpendicular to the rotation axis and to present a sensor body wall adjacent to a portion of the circumferential wall of the sensing ring. The sensor body holds at least one proximity detector directed at the sensing body wall and detecting the target as it rotates with the sensing ring and rotary clamp.

Thus, it is one object of the invention to provide a sensor that may be easily assembled to a power clamp and maintained after assembly. The notch in the sensor body allows the sensor body to be installed and removed without removal of the clamp arm that retains the sensor ring.

The sensor may have only one sensor ring with multiple coplanar targets exposed at the circumferential wall.

Thus, it is another object of the invention to provide an extremely low-profile sensor that may fit between the clamp arm and the power clamp body.

The thickness of the sensor may be substantially equal to the thickness of the sensing ring. An electrical connector and signal lights may be mounted on an overhang portion on the side of the power clamp. The overhang portion could be integral or a separate element.

Thus, it is another object of the invention to provide a sensor that has minimal thickness so as to allow the clamp arm to be positioned close to the power clamp body.

The sensor body may include two opposed mounting surfaces perpendicular to the rotation axis for mounting against a face of the power clamp. Alternatively, the sensor body may by symmetrical about a diameter of the sensing ring when installed, so as to be rotatable to mount against either of two faces of the power clamp.

Thus, it is another object of the invention to provide a design that may be used on either side of the clamp housing for left- or rightward extending clamp arms.

The targets may be metal targets extending radially toward the circumferential wall of the sensing ring.

Thus, it is another object of the invention to produce a robust sensing system that may use passive components on the rotating portion.

The sensing ring may include multiple targets.

Thus, it is another object of the invention to allow the sensor to work with clamp rotations of different angles without substantial change to the sensor body, but simply by modification of the sensor ring or the location of the targets in the sensor ring.

These particular objects and advantages may apply to only some embodiments falling within the claims and thus do not define the scope of the invention.

DETAILED DESCRIPTION OF THE PREFERRED EMBODIMENT

Figure 1:
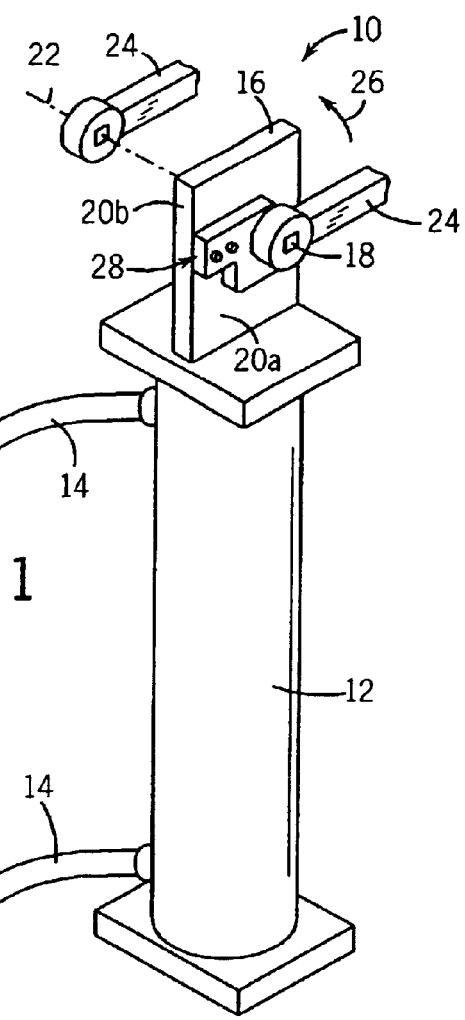
FIG. 1 is a perspective view of a power clamp showing placement of the clamp arm on either side of the clamp head and the positioning of the sensor of the present invention under the clamp arm on the right side of the clamp head.

Referring now to FIG. 1, a power clamp 10 includes a cylinder 12 that may receive hydraulic or pneumatic fluid through supply hoses 14 to drive an internal piston (not shown) up or down. A shaft (also not shown) of the piston is received by a clamp head 16 that includes a mechanism for converting the reciprocating linear motion of the piston shaft into a rotary motion acting on an axle 18. In the following example, the shaft is square in cross-section, but it will be understood that other shaft shapes may also be used. A clamp arm 24 may be placed on the axle 18 to rotate therewith about an axis 22 to provide a rotary clamping action 26.

The axle 18 may be repositioned to extend alternatively from a right face 20a or a left face 20b of the clamp head 16 so as to be positioned the clamp arm 24 on either side of the clamp head 16 as shown. A sensor 28 may likewise be attached to either face 20a or 20b of the clamp head to be adjacent to the clamp arm 24, as will be described.

Figure 2:
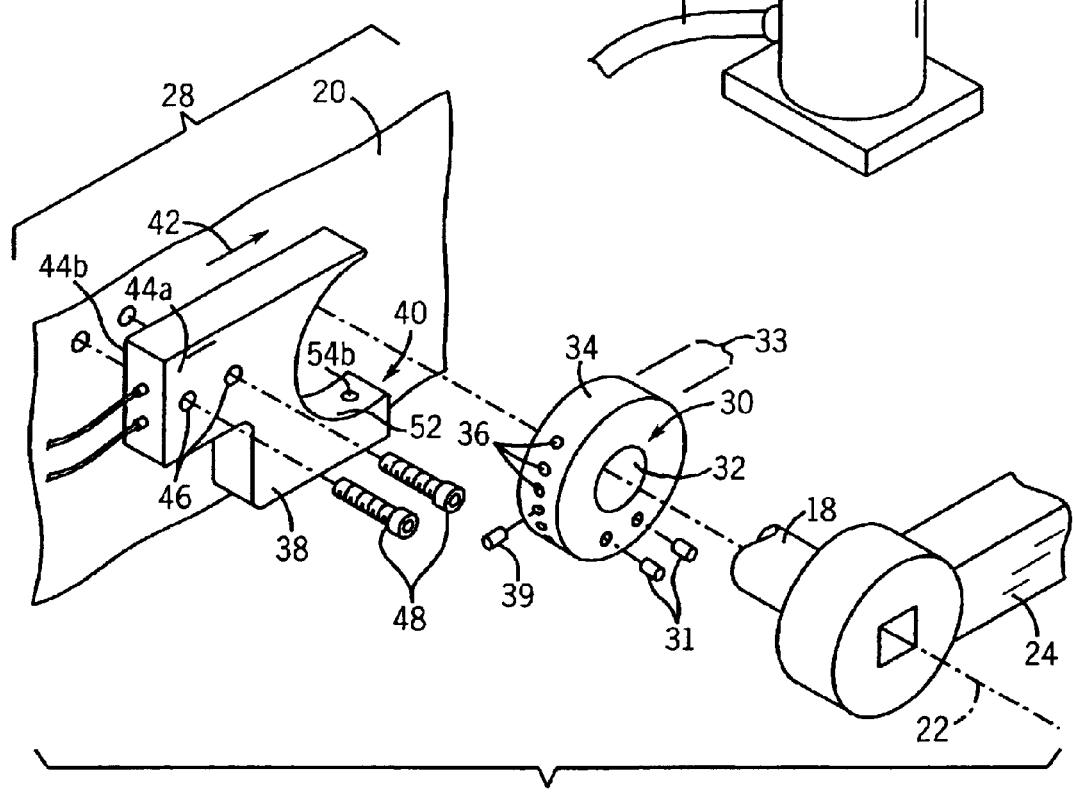
FIG. 2 is an exploded, perspective view of the clamp arm and its axle such as may fit through a sensing ring, the sensing ring received by a notch in a sensor body attached to the clamp head.

Referring to FIGS. 1 and 2, the sensor 28 includes generally a sensor ring 30 and a sensor body 38. The sensor ring 30 is positioned between the clamp arm 24 and a face 20 of the clamp head 16 and is constructed of a disc-shaped, non-metallic material having a circular bore 32 sized to receive the circular cross section of the axle 18 and to rotate therewith as keyed to the clamp arm by pins 31. An outer circumferential wall 34 of the sensor ring 30 includes a series of radial bores 36, which may receive one or more metallic targets 39 press fit into the sensor ring 30. As will be described, movement of the targets 39 among the bore 36 allow changing the detected limits of the clamp arm 24.

The sensor body 38 includes a hemi-circular notch 40 that may receive the sensor ring 30 with lateral motion of hte sensor body indicated by arrow 42. Thus the sensor body may be located in proximity to the sensor ring 30 after the sensor ring 30 has been assembled onto the axle 18. In this regard, the arc of the notch 40 is somewhat less than 180 degrees allowing sufficient clearance for this sideward engagement.

The sensor body 38 includes a front face 44a and a rear face 44b sized to abut the faces 20a and 20b of the clamp head 16. Mounting holes 46 receiving cap screws 48 to mount either rear face 44b against face 20a or front face 44a against face 20b. In this way, the sensor 28 may be used with the clamp arm 24 on either side of the clamp head 16. The thickness 33 of the sensor ring 30 and sensor body 38 may be comparable and minimized so as to allow clamp arm 24 to be as close as possible to clamp head 16.

The notch 40 in the sensor body 38 defines a sensor body wall 52 having an arc generally conforming to the circumferential wall 34 of the sensor ring 30. Directed toward the sensor body wall 52 are a first and second proximity sensor 54a and 54b (54a shown in FIG. 4) of conventional design that may detect the targets 39 in the circumferential wall 34 as they move past the proximity sensors 54a and 54b. A variety of different types of proximity sensors 54a and 54b may be used, for example, those detecting eddy current resistance, inductive change, or magnetic hysteresis, according to methods well known in the art.

Figure 3:
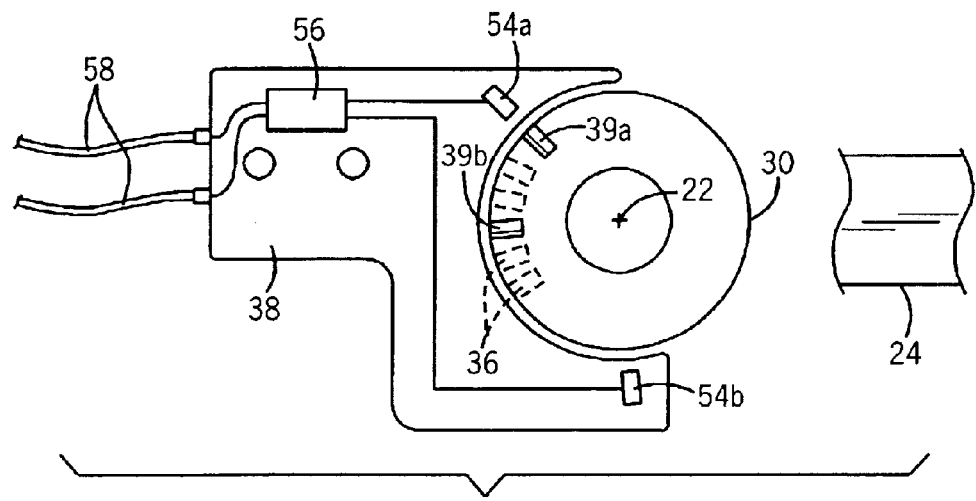
FIGS. 3 and 4 are front elevational views of the sensor of FIG. 2 showing alignment of targets in the sensor ring with proximity detectors in the sensor body for a first and second clamp position.

Referring now to FIG. 3, the proximity sensors 54a and 54b communicate with amplification circuitry 56, which provides switch signals on lines 58 that may be forwarded to an industrial control device or the like. The proximity sensors 54a and 54b may be spaced at an angular range 55 along the notch 40 sufficient to exceed the angular operating range of the clamp arm 24, for example, 120 to 135 degrees. While a single target 39a may be used and detected as it passes each proximity sensor 54a and 54b, this limits the detection of the clamp arm 24 to the limits defined by the separation of the proximity sensors 54a and 54b. Accordingly, multiple targets 39a and 39b may be used to define a subset of the angular range of the proximity sensors 54a and 54b at which clamp arm motion will be detected. Also, the sensor ring could be designed to exceed the angular operation range of clamp arm. (Greater than 135 degree but less then 270 degrees).

Figure 4:
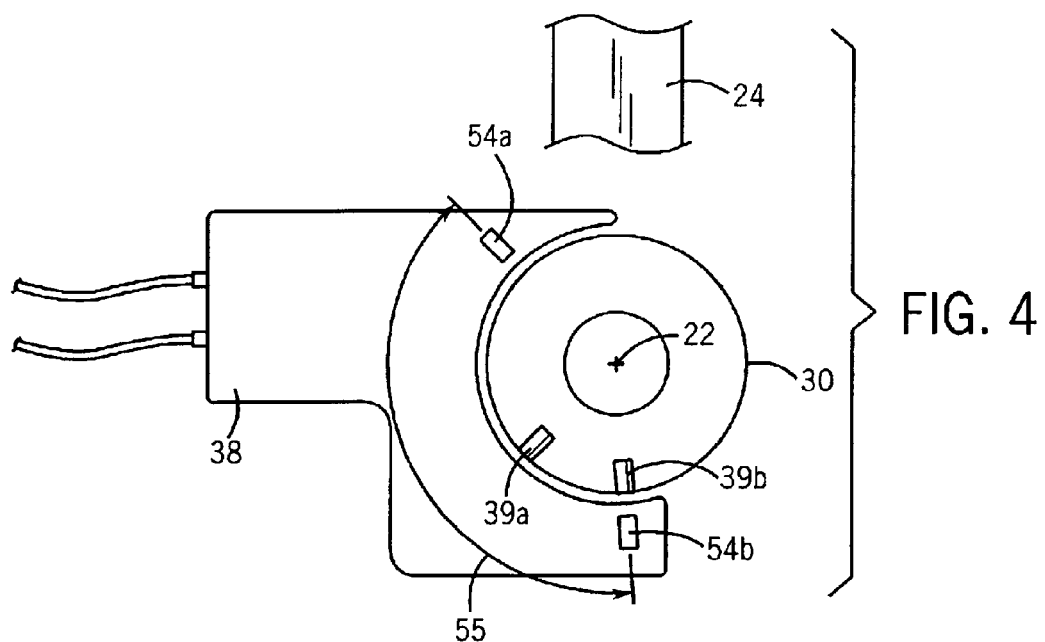

For example, and referring to FIG. 3, with the clamp arm 24 in the horizontal position, target 39a will align with proximity sensor 54a producing a first limit signal via circuitry 56 (e.g., a clamp signal). Rotation of the clamp arm 24 to a vertical position as shown in FIG. 4 (90 degrees away from the position shown in FIG. 3) brings target 39b into alignment with proximity sensor 54b producing a separate limit signal (e.g. an unclamp signal). Despite the separation of the proximity sensors 54a and 54b by an amount greater than 90 degrees, 90-degree motion limits may be readily detected.

Additional flexibility in setting detection limits may be provided by drilling multiple bores 36 in the sensor ring 30 so that the location of targets 39 may be moved on an application-by-application basis.

The proximity sensors 54a and 54b and the circuitry 56 may be potted within an injection molding housing or may be molded in place during the injection molding processes (RIM molding).

Figure 5:
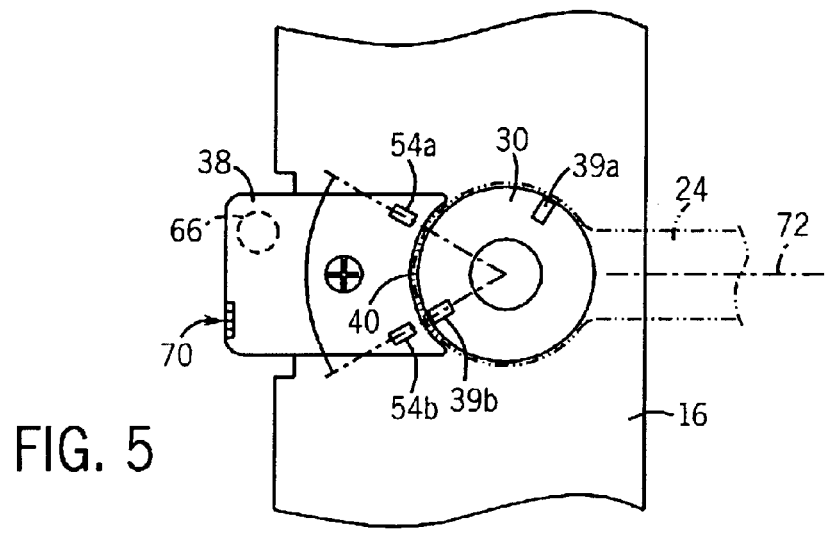
FIG. 5 is a view similar to FIGS. 3 and 4 showing an alternative embodiment of the invention having a notch with a reduced arcuate extent.
Figure 6:
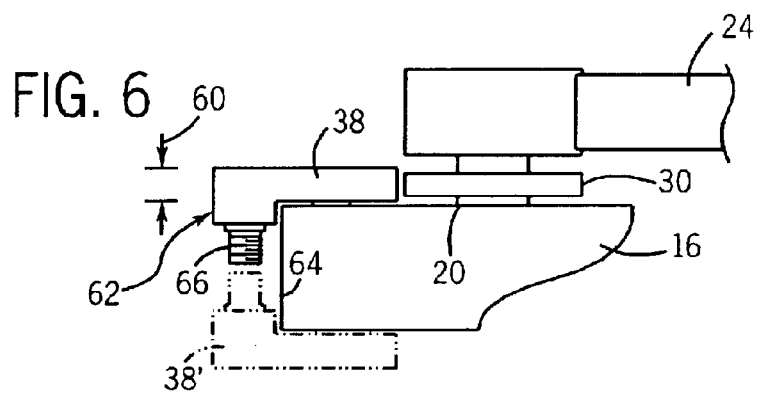
FIG. 6 is a side elevation of FIG. 5 showing the low profile of the sensor of FIG. 5 and the use of an overhang portion to carry light-emitting diodes and an electrical connector that would otherwise increase the sensor thickness under the clamp arm.

Referring now to FIGS. 5 and 6, in a second embodiment, the hemi-circular notch 40 of the sensor body 38 may be reduced to an angular extent less than ninety degrees to support two proximity sensors 54a and 54b separated by the angular range 55 of approximately forty-five degrees. While a single target 39a may be used and detected as it passes each proximity sensor 54a and 54b, this limits the detection of the clamp arm 24 to the limits defined by the separation of the proximity sensors 54a and 54b. Accordingly, again, multiple targets 39a and 39b may be used but this time to define a superset of the angular range 55 of the proximity sensors 54a and 54b at which clamp arm motion will be detected.

For example, with the clamp arm 24 in the horizontal position, target 39b will align with proximity sensor 54b producing a first limit signal via circuitry 56 (e.g., a clamp signal). Rotation of the clamp arm 24 to a vertical position brings target 39a into alignment with proximity sensor 54a producing a separate limit signal (e.g. an unclamp signal). Despite the separation of the proximity sensors 54a and 54b by an amount less than 90 degrees, 90-degree motion limits may be readily detected.

As shown best in FIG. 6, the thickness 60 of the sensor body 38 is comparable to the thickness of the sensor ring 30 both of which may be less than approximately one-half inch so as to fit easily under the clamp arm 24 without interference. A overhang portion 62 of the sensor body 38 may extend over a side face 64 of the clamp head perpendicular to the face 20 allowing components requiring greater depth to be mounted on the overhang portion 62 while keeping the thickness 60 measured along an axis from the face 20 to the underside of the clamp arm 24 low. Among the components mounted on the overhang portion 62 can be a plug type electrical connecter 66 receiving a connecting plug (not shown). The plug type electrical connector 66 is oriented on the overhang portion 62 so that any cabling connected to the connector 66 is directed away from the path of the arm 24.

Light-emitting diode displays 70 may also be exposed on the overhang portion 62 so as to provide a larger indicator area. The light-emitting diode displays 70 may read signals from the proximity sensors 54a and 54b to display clamp state (e.g., open, closed, or moving) and/or diagnostic information about the sensor (e.g., presence of power, detection of targets 39).

The symmetry of the sensor body 38 where it attached to the clamp head 16 and the symmetry of the proximity sensors 54a and 54b about a diametric axis 72 of the sensor wheel, allow the sensor body 38 to be rotated about the diametric axis 72 to be attached to the opposite side of the clamp head 16 as shown in FIG. 6 as sensor body 38'. Again any cable connected to the connector 66 is directed away from the clamp arm 24.

Figure 7:
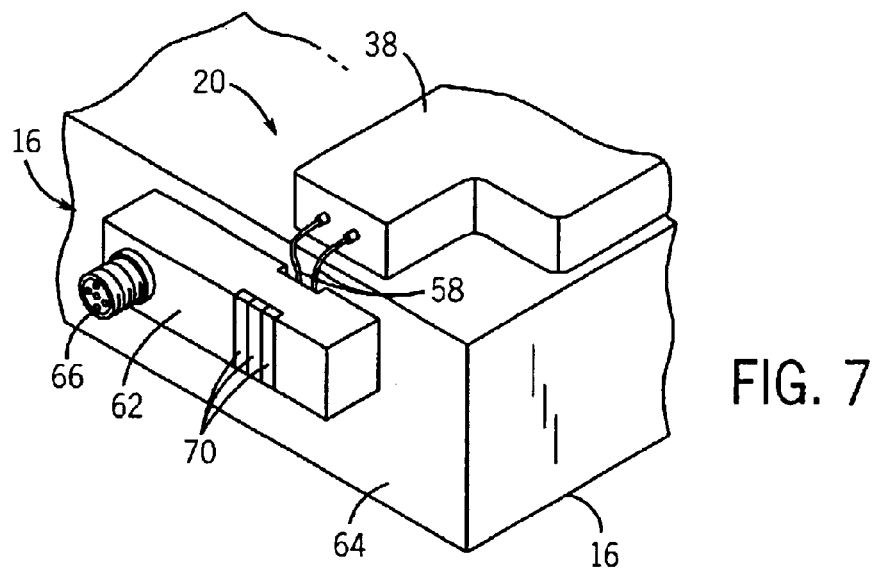
FIG. 7 is a perspective view of an alternative overhang portion attached by wires to the sensor to be independently mounted to the clamp.

Referring now to FIG. 7, the overhang portion 62 need not be integral to the remainder of the sensor body 38 but may be joined only by flexible electrical lines 58 and the overhang portion 62 attached independently to the clamp head 16 on side face 64. This configuration provides even greater flexibility in mounting the sensor body 38, allowing the sensor body 38 excluding the overhang portion 62 to be rotated and the overhang portion 62 to remain unrotated or allowing movement between the two so that the overhang portion 62 may be mounted more conveniently.

It is specifically intended that the present invention not be limited to the embodiments and illustrations contained herein, but include modified forms of those embodiments including portions of the embodiments and combinations of elements of different embodiments as come within the scope of the following claims.

We claim:

1. A sensor for use with a power clamp having a piston actuated rotary clamp arm, the sensor comprising:
   a sensing ring attachable co-axially around an axle of the rotary clamp arm to rotate therewith about a rotation axis, the sensing ring having a circumferential wall including at least one target exposed at the circumferential wall;
   a sensor body having a notch opening on one side that engages the sensing ring when the sensor body moves toward the sensing ring in a direction that is perpendicular to the rotation axis to present a sensor body wall adjacent to a portion of the circumferential wall of the sensing ring; and
   the sensor body holding at least one proximity detector directed at the sensor body wall to detect the at least one target as it rotates with the sensing ring and rotary clamp arm.

2. The sensor of claim 1 wherein the sensing ring is non-metallic.

3. The sensor of claim 1 wherein the sensor body wall is an arc extending no more than 180 degrees.

4. The sensor of claim 1 wherein the sensor body includes a planar surface perpendicular to the rotation axis for mounting against a clamp face of the power clamp.

5. The sensor of claim 4 including an overhang portion extending along clamp edge perpendicular to the clamp face to support an electrical connector receiving signals from the at least one proximity detector.

6. The sensor of claim 5 wherein the overhang portion also supports at least one light-emitting diode indicator indicating a state of the clamp.

7. The sensor of claim 4 wherein the two proximity detectors of the sensor body when installed about the sensing ring are substantially symmetrical about a diametric axis of the sensing ring, so as to allow mounting of the sensor body against either of two faces of the power clamp with simple rotation of the sensor body about the diametric axis.

8. The sensor of claim 1 wherein the sensor body includes two opposed mounting surfaces perpendicular to the rotation axis, each surface sized to alternately mount against a clamp face of the power clamp.

9. The sensor of claim 1 wherein the at least one target is metallic and extends radially toward the circumferential wall of the sensing ring.

10. The sensor of claim 1 including multiple targets lying in a single plane perpendicular to the rotation axis.

11. The sensor of claim 1 including two proximity detectors oriented to sense a target at two angles about the rotation axis.

12. The sensor of claim 1 including a plurality of radially extending holes in said sensing ring spanning an arc of approximately 120–270 degrees about the rotation axis into which the at least one target may be selectively fit.

13. The sensor of claim 11 wherein the angles of the two proximity detectors are separated by less than 90 degrees.

14. The sensor of claim 1 wherein a thickness of the sensor body measured along the rotation axis is substantially equal to the thickness of the sensing ring measured along the rotation axis.

15. A sensor for use with a power clamp having a piston actuated rotary clamp arm, the sensor comprising:
   a one and only one sensing ring attached co-axially to an axle of the rotary clamp arm to rotate therewith about a rotation axis, the sensing ring having a circumferential wall including at least two substantially co-planar targets exposed at the circumferential wall;
   a sensor body having an opening receiving the sensing ring to present a sensor body wall adjacent to a portion of the circumferential wall of the sensing ring; and
   the sensor body holding at least one proximity detector directed at the sensor body wall to detect at least one target as it rotates with the sensing ring and rotary clamp arm.

16. The sensor of claim 15 wherein the sensing ring is non-metallic.

17. The sensor of claim 15 wherein the sensor body has a notch opening on one side to receive the sensing ring with motion of the sensor body perpendicular to the rotation axis.

18. The sensor of claim 15 wherein the sensor body wall is an arc extending no more than 180 degrees.

19. The sensor of claim 15 wherein a thickness of the sensor body measured along the rotation axis is substantially equal to a thickness of the sensing ring measured along the rotation axis and wherein the sensor body includes a first face mounting against a clamp face of the power clamp and an overhang portion extending along a clamp edge perpendicular to the clamp face to support an electrical connector receiving signals from the at least one proximity detector.

20. The sensor of claim 19 wherein the overhang portion also supports at least one light-emitting diode indicator facing perpendicularly to the rotation axis and indicating a state of the clamp.

21. The sensor of claim 19 wherein the overhang portion is rigidly attached to a remainder of the sensor body.

22. The sensor of claim 19 wherein the overhang portion is attached only by wires to a remainder of the sensor body.

23. The sensor of claim 15 including two proximity detectors oriented to sense a target at two angles about the rotation axis.

24. A power clamp comprising:
   a power cylinder;
   a clamp head communicating with the power cylinder to rotate an axle extending from a clamp face of the clamp head;
   a rotary clamp arm attached to the axle to rotate therewith;
   a sensing ring attached co-axially to an axle of the rotary clamp arm between the rotary clamp arm and the clamp face to rotate therewith about a rotation axis, the sensing ring having a circumferential wall including at least two substantially co-planar targets exposed at the circumferential wall;
   a sensor body having an opening, receiving the sensing ring to present a sensor body wall adjacent to a portion of the circumferential wall of the sensing ring; and
   the sensor body holding at least one proximity detector directed at the sensor body wall to detect the target as they rotates with the sensing ring and rotary clamp arm.

* * * * *

UNITED STATES PATENT AND TRADEMARK OFFICE
CERTIFICATE OF CORRECTION

PATENT NO. : 6,940,276 B2
DATED : September 6, 2005
INVENTOR(S) : Shafiyan-Rad et al.

It is certified that error appears in the above-identified patent and that said Letters Patent is hereby corrected as shown below:

Title page,
Item [75], Inventors, "Larry Fisher" should be -- Larry Fischer --.

Column 3,
Line 26, "of hte" should be -- of the --.

Signed and Sealed this

Twenty-seventh Day of December, 2005

JON W. DUDAS
*Director of the United States Patent and Trademark Office*